US012646731B2

(12) United States Patent
Yeon

(10) Patent No.: US 12,646,731 B2
(45) Date of Patent: Jun. 2, 2026

(54) FUEL CELL VEHICLE

(71) Applicants: Hyundai Motor Company, Seoul (KR); Kia Corporation, Seoul (KR)

(72) Inventor: Seung Jun Yeon, Yongin (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 667 days.

(21) Appl. No.: 17/986,254

(22) Filed: Nov. 14, 2022

(65) Prior Publication Data

US 2023/0178775 A1 Jun. 8, 2023

(30) Foreign Application Priority Data

Dec. 2, 2021 (KR) ........................ 10-2021-0170865

(51) Int. Cl.
| | |
|---|---|
| *H01M 8/04828* | (2016.01) |
| *B60L 50/71* | (2019.01) |
| *B60L 50/72* | (2019.01) |
| *B60L 58/30* | (2019.01) |
| *H01M 8/04746* | (2016.01) |
| *H01M 8/10* | (2016.01) |
| *H01M 8/2484* | (2016.01) |

(52) U.S. Cl.
CPC ......... *H01M 8/04843* (2013.01); *B60L 50/71* (2019.02); *B60L 50/72* (2019.02); *B60L 58/30* (2019.02); *H01M 8/04761* (2013.01); *H01M 8/2484* (2016.02); *H01M 2008/1095* (2013.01); *H01M 2250/20* (2013.01)

(58) Field of Classification Search
CPC ...... H01M 2008/1095; H01M 2250/20; B60L 50/71; B60L 50/72; B60L 58/30; B60L 50/75; B60L 3/0053; Y02E 60/50; Y02T 90/40; B60K 1/04
See application file for complete search history.

(56) References Cited

U.S. PATENT DOCUMENTS

| | | | |
|---|---|---|---|
| 2006/0289224 A1* | 12/2006 | Ono | B60L 1/003 180/311 |
| 2009/0025566 A1* | 1/2009 | Son | H01M 8/04164 96/397 |
| 2010/0147608 A1* | 6/2010 | Okabe | H01M 8/248 29/428 |
| 2017/0256762 A1* | 9/2017 | Naito | B60K 1/00 |
| 2020/0091530 A1* | 3/2020 | Yu | B60L 58/33 |

* cited by examiner

*Primary Examiner* — Adam A Arciero
(74) *Attorney, Agent, or Firm* — Fox Rothschild LLP

(57) ABSTRACT

A fuel cell vehicle is provided. The fuel cell vehicle includes a fuel cell including a cell stack configured such that a plurality of unit cells is stacked, a drive motor unit disposed below the fuel cell, a purge valve/drain valve assembly configured to discharge unreacted hydrogen and first condensate water flowing together out of the fuel cell, an air exhaust line configured to discharge unreacted oxygen and second condensate water flowing together out of the fuel cell, and a hydrogen exhaust line connecting the purge valve/drain valve assembly to the air exhaust line and disposed so as to avoid interference with the drive motor unit.

19 Claims, 8 Drawing Sheets

100A

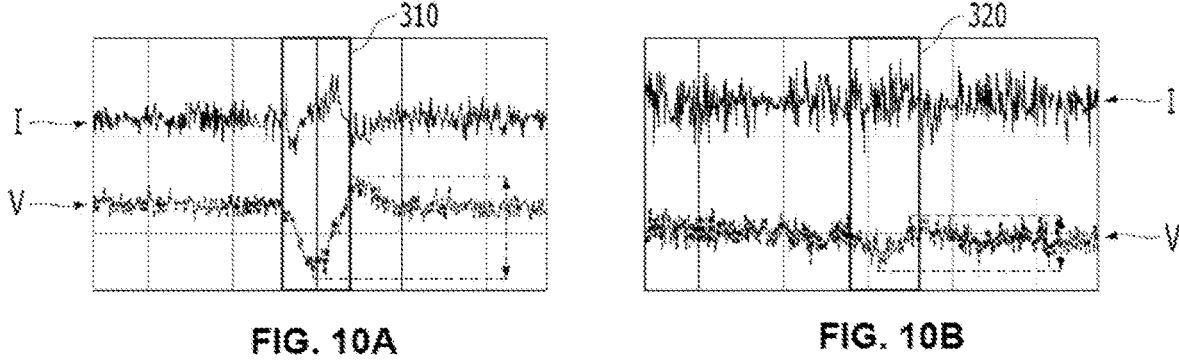
FIG. 10A                    FIG. 10B
FIG. 11
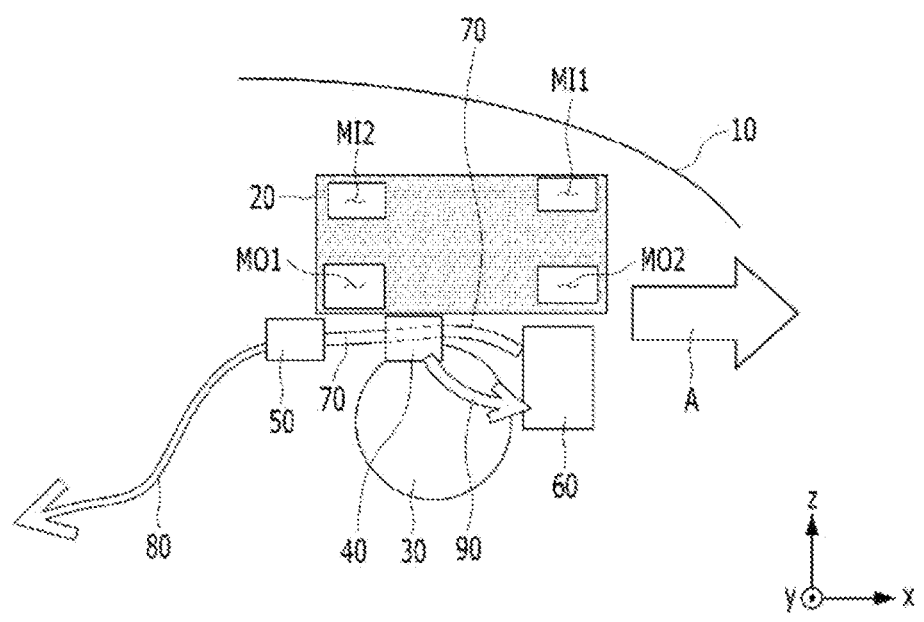

FUEL CELL VEHICLE

CROSS REFERENCE TO RELATED APPLICATION

This application is based on and claims under 35 U.S.C. § 119 (a) the benefit of Korean Patent Application No. 10-2021-0170865, filed on Dec. 2, 2021, which is hereby incorporated by reference as if fully set forth herein.

TECHNICAL FIELD

Embodiments of the present disclosure relate to a fuel cell vehicle.

BACKGROUND

A fuel cell vehicle employs a hydrogen recirculation structure in order to improve fuel efficiency. That is, when the concentration of hydrogen that is supplied to a cell stack falls below a reference value during a recirculation process, hydrogen purging is performed to secure the concentration of hydrogen. During the recirculation process, when moisture generated from an anode affects the concentration of hydrogen, the moisture in the form of droplets condensed in a condensation chamber is removed through a drain valve. The purging and draining processes are performed using the pressure difference between the anode (hydrogen) and the cathode (air). Research with the goal of ensuring driving safety during hydrogen purging in a fuel cell vehicle is underway.

SUMMARY

Accordingly, embodiments are directed to a fuel cell vehicle that substantially obviates one or more problems due to limitations and disadvantages of the related art.

Embodiments provide a fuel cell vehicle having improved driving safety.

However, the objects to be accomplished by the embodiments are not limited to the above-mentioned objects, and other objects not mentioned herein will be clearly understood by those skilled in the art from the following description.

A fuel cell vehicle according to an exemplary embodiment may include a fuel cell including a cell stack configured such that a plurality of unit cells is stacked, a drive motor unit disposed below the fuel cell, a purge valve/drain valve assembly configured to discharge unreacted hydrogen and first condensate water flowing together out of the fuel cell, an air exhaust line configured to discharge unreacted oxygen and second condensate water flowing together out of the fuel cell, and a hydrogen exhaust line connecting the purge valve/drain valve assembly to the air exhaust line and disposed so as to avoid interference with the drive motor unit.

For example, the hydrogen exhaust line may be disposed behind the drive motor unit based on the direction in which the fuel cell vehicle travels.

For example, the purge valve/drain valve assembly may be configured such that a purge valve and a drain valve are integrated, or may be configured such that a purge valve and a drain valve are provided separately from each other.

For example, the hydrogen exhaust line may include a first hydrogen exhaust line, connecting the drain valve to the air exhaust line and disposed so as to avoid interference with the drive motor unit, and a second hydrogen exhaust line, connecting the purge valve to the air exhaust line.

For example, the purge valve may be disposed in the fuel cell, and the drain valve may be disposed closer to the ground than the fuel cell.

For example, the fuel cell vehicle may further include a controller configured to generate a control signal when at least one condition, among whether purging of the unreacted hydrogen is required and whether the level of the first condensate water is equal to or higher than a predetermined level, is satisfied. The purge valve/drain valve assembly may discharge the unreacted hydrogen and the first condensate water to the hydrogen exhaust line in response to the control signal.

For example, the outlet of each of the purge valve/drain valve assembly and the hydrogen exhaust line may be located closer to the ground than the inlet thereof.

For example, the plurality of unit cells may be stacked in a direction intersecting the direction in which the fuel cell vehicle travels. In this case, the fuel cell vehicle may further include an air pressure controller connected to the air exhaust line, and the air pressure controller and the purge valve/drain valve assembly may be spaced apart from each other, with the drive motor unit interposed therebetween.

For example, the plurality of unit cells may be stacked in a direction parallel to the direction in which the fuel cell vehicle travels. In this case, a portion of the purge valve/drain valve assembly may overlap the drive motor unit in the direction in which the fuel cell vehicle travels.

For example, the hydrogen exhaust line may be inclined at a predetermined angle or greater with respect to a horizontal plane parallel to the ground.

For example, the fuel cell vehicle may further include an air pressure controller connected to the air exhaust line. The air pressure controller and the purge valve/drain valve assembly may be disposed adjacent to each other, without the drive motor unit therebetween, in a direction intersecting the direction in which the fuel cell vehicle travels.

For example, the air exhaust line may be disposed behind the purge valve/drain valve assembly and the fuel cell based on the direction in which the fuel cell vehicle travels.

For example, the fuel cell may further include a hydrogen inflow manifold configured to receive hydrogen flowing thereinto as a reactant gas, an air inflow manifold disposed behind the hydrogen inflow manifold based on the direction in which the fuel cell vehicle travels and configured to receive air flowing thereinto as a reactant gas, an air outflow manifold disposed below the hydrogen inflow manifold and configured to discharge the unreacted oxygen and the second condensate water, and a hydrogen outflow manifold disposed below the air inflow manifold and behind the air outflow manifold based on the direction in which the fuel cell vehicle travels and configured to discharge the unreacted hydrogen and the second condensate water.

For example, the fuel cell may further include an air inflow manifold configured to receive air flowing thereinto as a reactant gas, a hydrogen inflow manifold disposed behind the air inflow manifold based on the direction in which the fuel cell vehicle travels and configured to receive hydrogen flowing thereinto as a reactant gas, a hydrogen outflow manifold disposed below the air inflow manifold and configured to discharge the unreacted hydrogen and the second condensate water, and an air outflow manifold disposed below the hydrogen inflow manifold and behind the hydrogen outflow manifold based on the direction in which the fuel cell vehicle travels and configured to discharge the unreacted oxygen and the second condensate water.

For example, the bottom surface of each of the air inflow manifold and the hydrogen inflow manifold may be located farther from the ground than the top surface of each of the air outflow manifold and the hydrogen outflow manifold. The top surface of each of the air outflow manifold and the hydrogen outflow manifold may be located farther from the ground than the top surface of a humidifier. The bottom surface of each of the air outflow manifold and the hydrogen outflow manifold may be located farther from the ground than the top surface of the purge valve/drain valve assembly.

As discussed, the method and system suitably include use of a controller or processer.

In another aspect, vehicles are provided that comprise the fuel cell as disclosed herein.

BRIEF DESCRIPTION OF THE DRAWINGS

The accompanying drawings, which are included to provide a further understanding of the present disclosure and are incorporated in and constitute a part of this application, illustrate embodiment(s) of the present disclosure and together with the description serve to explain the principle of the present disclosure. In the drawings:

FIGS. 10A and 10B are waveform diagrams of stack current and stack voltage at each purge position; and FIG. 11 is a side view of a fuel cell vehicle according to a comparative example.

DETAILED DESCRIPTION

Figure 1:
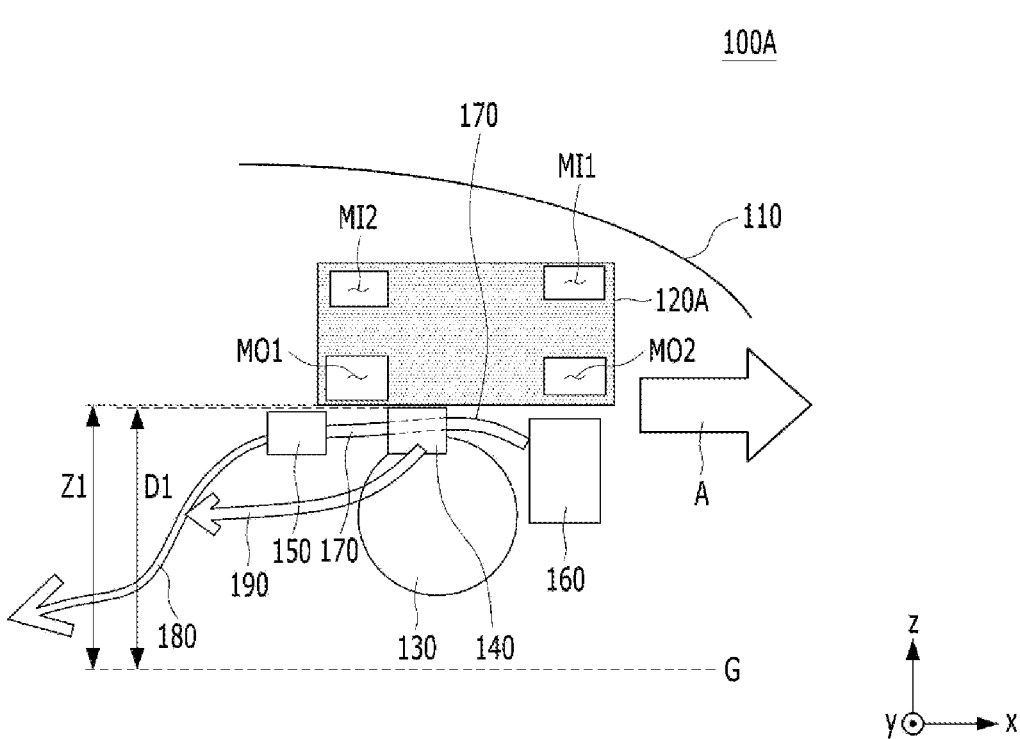
FIG. 1 is a side view of a fuel cell vehicle according to an exemplary embodiment.

The present disclosure will now be described more fully hereinafter with reference to the accompanying drawings, in which various embodiments are shown. The examples, however, may be embodied in many different forms, and should not be construed as being limited to the embodiments set forth herein. Rather, these embodiments are provided so that this disclosure will be more thorough and complete, and will more fully convey the scope of the present disclosure to those skilled in the art.

It will be understood that when an element is referred to as being "on" or "under" another element, it may be directly on/under the element, or one or more intervening elements may also be present.

When an element is referred to as being "on" or "under", "under the element" as well as "on the element" may be included based on the element.

In addition, relational terms, such as "first", "second", "on/upper part/above" and "under/lower part/below", are used only to distinguish between one subject or element and another subject or element, without necessarily requiring or involving any physical or logical relationship or sequence between the subjects or elements.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, fuel cell vehicles 100A to 100E according to embodiments will be described with reference to the accompanying drawings. The fuel cell vehicles 100A to 100E will be described using the Cartesian coordinate system (x-axis, y-axis, z-axis) for convenience of description, but may also be described using other coordinate systems. In the Cartesian coordinate system, the x-axis, the y-axis, and the z-axis are perpendicular to each other, but the embodiments are not limited thereto. That is, the x-axis, the y-axis, and the z-axis may intersect each other obliquely. For convenience of description, the x-axis direction will be referred to as a "first direction", the y-axis direction will be referred to as a "second direction", and the z-axis direction will be referred to as a "third direction". Here, the direction in which the fuel cell vehicles 100A to 100E travel is the +x-axis direction, indicated by the arrow A.

Figure 2:
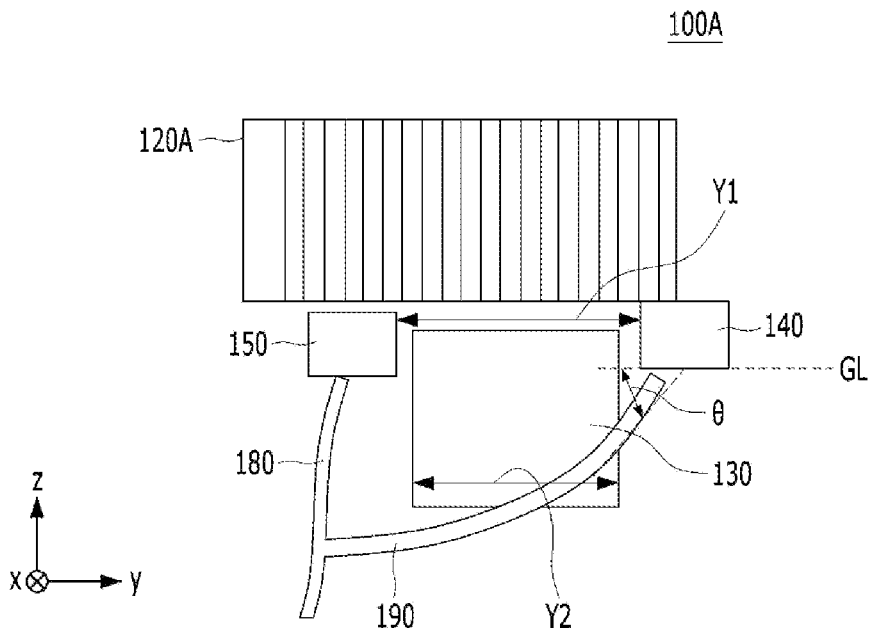
FIG. 2 is a rear view of the fuel cell vehicle shown in FIG. 1.

FIG. 1 is a side view of a fuel cell vehicle 100A according to an exemplary embodiment, and FIG. 2 is a rear view of the fuel cell vehicle 100A shown in FIG. 1.

Although the drive motor unit 130 shown in FIG. 1 is illustrated as having a circular shape and the drive motor unit 130 shown in FIG. 2 is illustrated as having a rectangular shape, the embodiments are not limited to any specific shape of the drive motor unit 130.

The fuel cell vehicle 100A according to an exemplary embodiment may include a fuel cell, a drive motor unit 130, a purge valve (FPV)/drain valve (FDV) assembly 140, air exhaust lines 170 and 180, and a hydrogen exhaust line 190. In addition, the fuel cell vehicle 100A according to an exemplary embodiment may further include an air pressure controller (APC) (or an air pressure control valve) 150 and a humidifier 160. In addition, the fuel cell vehicle 100A according to an exemplary embodiment may further include a hood 110.

The fuel cell may include a unit fuel cell that is not stacked in either a vertical direction or a horizontal direction. Alternatively, the fuel cell may include a plurality of unit fuel cells stacked in at least one of the vertical direction or the horizontal direction. For example, the fuel cell may include a plurality of unit fuel cells stacked in at least one of the x-axis direction, the y-axis direction, or the z-axis direction.

Hereinafter, the fuel cell of each of the fuel cell vehicles 100A, 100B, 100C, 100D, and 100E according to embodiments will be described as including a single unit fuel cell. However, the following description may also apply to the case in which the fuel cell according to the embodiment includes a plurality of unit fuel cells.

The unit fuel cell may be a polymer electrolyte membrane fuel cell (or a proton exchange membrane fuel cell) (PEMFC), which has been studied most extensively as a power source. However, the embodiments are not limited to any specific type (configuration or external appearance) of unit fuel cell.

The unit fuel cell included in the fuel cell may include end plates (or pressing plates or compression plates) (not shown), current collectors (not shown), and a cell stack. For better understanding of the stacking direction of the cell stacks 120A, 120B, and 120C in the fuel cell vehicles 100A to 100E according to embodiments, illustration of elements other than the cell stacks 120A, 120B, and 120C in the fuel cell is omitted. Therefore, the following description will be made on the assumption that the position of the cell stacks 120A, 120B, and 120C illustrated herein is the position of the fuel cell, which is not illustrated herein.

The fuel cell may include a cell stack 120A, which is configured such that a plurality of unit cells is stacked. The cell stack 120A may be of a longitudinal type in which a plurality of unit cells is stacked in the first direction, which is the direction in which the fuel cell vehicle 100A travels, or may be of a transverse type in which a plurality of unit cells is stacked in the second direction, which intersects the first direction. The cell stack 120A shown in FIGS. 1 and 2 is of a transverse type.

Several tens to several hundreds of unit cells, e.g. 100 to 400 unit cells, may be stacked to form the cell stack 120A. The number of unit fuel cells included in the fuel cell and the number of unit cells included in the cell stack 120A of the unit fuel cell may be determined depending on the intensity of the power to be supplied from the unit fuel cell to a load. Here, "load" may refer to a part that requires power in the fuel cell vehicles 100A to 100E.

The end plates may be disposed at respective ends of the cell stack 120A, and may support and fix the plurality of unit cells. That is, the first end plate may be disposed at one of the two ends of the cell stack, and the second end plate may be disposed at the other of the two ends of the cell stack.

In addition, the fuel cell may further include a clamping member. For example, in each unit fuel cell, the clamping member serves to clamp the plurality of unit cells together with the end plates in the direction in which the unit cells are stacked. The clamping member may be implemented as a clamping bar (not shown) or an enclosure (not shown).

The cell stack 120A may include a hydrogen inflow manifold (or a hydrogen inlet manifold) MI1, an air inflow manifold MI2, a hydrogen outflow manifold (a hydrogen outlet manifold) MO1, and an air outflow manifold MO2.

The hydrogen inflow manifold MI1 may be a manifold into which hydrogen, which is a reactant gas to be used in the cell stack 120A, is introduced from the outside of the unit fuel cell, and the air inflow manifold MI2 is a manifold into which air containing oxygen, which is a reactant gas to be used in the cell stack 120A, is introduced from the outside of the unit fuel cell.

The hydrogen outflow manifold MO1 may be a manifold from which hydrogen that has been completely used in the cell stack 120A, i.e. unreacted hydrogen, and condensate water (or product water), which is a byproduct (hereinafter referred to as "first condensate water"), are discharged to the outside of the cell stack 120A. The air outflow manifold MO2 may be a manifold from which oxygen that has been completely used in the cell stack 120A, i.e. unreacted oxygen, and condensate water, which is a byproduct (hereinafter referred to as "second condensate water"), are discharged to the outside of the cell stack 120A.

In this case, the hydrogen outflow manifold MO1 and the air outflow manifold MO2 may be disposed below the hydrogen inflow manifold MI1 and the air inflow manifold MI2. Further, the manifolds through which the same reactant gas is introduced and discharged may be disposed so as to be spaced apart from each other in the diagonal direction. For example, the hydrogen inflow manifold MI1 and the hydrogen outflow manifold MO1 may be disposed so as to be spaced apart from each other in the diagonal direction, and the air inflow manifold MI2 and the air outflow manifold MO2 may be disposed so as to be spaced apart from each other in the diagonal direction.

Figure 3:
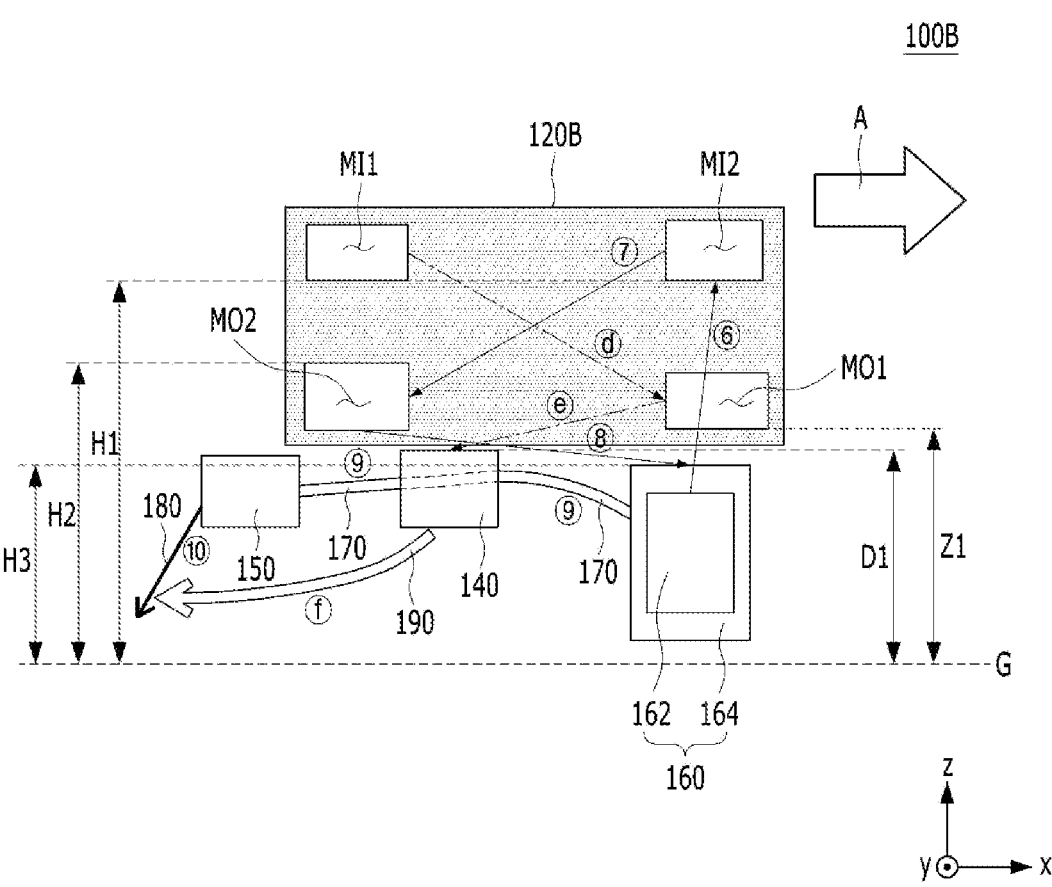
FIG. 3 is a side view of a fuel cell vehicle according to another embodiment.

FIG. 3 is a side view of a fuel cell vehicle 100B according to another embodiment.

Although illustration of the drive motor unit 130 shown in FIG. 2 is omitted from FIG. 3, the fuel cell vehicle 100B may include the drive motor unit 130, which is disposed below the fuel cell, as shown in FIG. 1. Since the fuel cell vehicle 100B shown in FIG. 3 is the same as the fuel cell vehicle 100A shown in FIG. 1, with the exception that the manifolds are disposed differently, the same parts are denoted by the same reference numerals, and duplicate descriptions thereof will be omitted.

According to one embodiment, as shown in FIG. 1, based on the direction in which the fuel cell vehicle 100A travels, the air inflow manifold MI2 may be disposed behind the hydrogen inflow manifold MI1, the air outflow manifold MO2 may be disposed below the hydrogen inflow manifold MI1, and the hydrogen outflow manifold MO1 may be disposed behind the air outflow manifold MO2 and below the air inflow manifold MI2.

According to another embodiment, as shown in FIG. 3, based on the direction in which the fuel cell vehicle 100B travels, the hydrogen inflow manifold MI1 may be disposed behind the air inflow manifold MI2, the hydrogen outflow manifold MO1 may be disposed below the air inflow manifold MI2, and the air outflow manifold MO2 may be disposed behind the hydrogen outflow manifold MO1 and below the hydrogen inflow manifold MI1.

Although not shown, the fuel cell may further include a cooling medium inflow manifold, through which a cooling medium (e.g. coolant) necessary to maintain the temperature in the cell stack 120A or 120B is introduced into a unit fuel cell from outside, and a cooling medium outflow manifold, through which the cooling medium is discharged from the inside of the unit fuel cell to the outside thereof.

The drive motor unit 130 may be disposed below the fuel cell. For example, the drive motor unit 130 may include a drive motor, which is disposed below the fuel cell, and an inverter, which is connected to the drive motor and is disposed below the fuel cell. For example, the inverter may be disposed adjacent to the drive motor in the direction in which the fuel cell vehicles 100A and 100B travel. For example, the inverter may be disposed between the drive motor and the fuel cell.

The purge valve/drain valve assembly 140 may serve to discharge unreacted hydrogen and the first condensate water, which flow together out of the fuel cell. When the concentration (or purity) of unreacted hydrogen flowing out of the fuel cell is equal to or less than a reference value, the purge valve 140 discharges the unreacted hydrogen to the outside, and when the level of the first condensate water is equal to or higher than a predetermined level, the drain valve 140 discharges the first condensate water to the outside.

Figure 4:
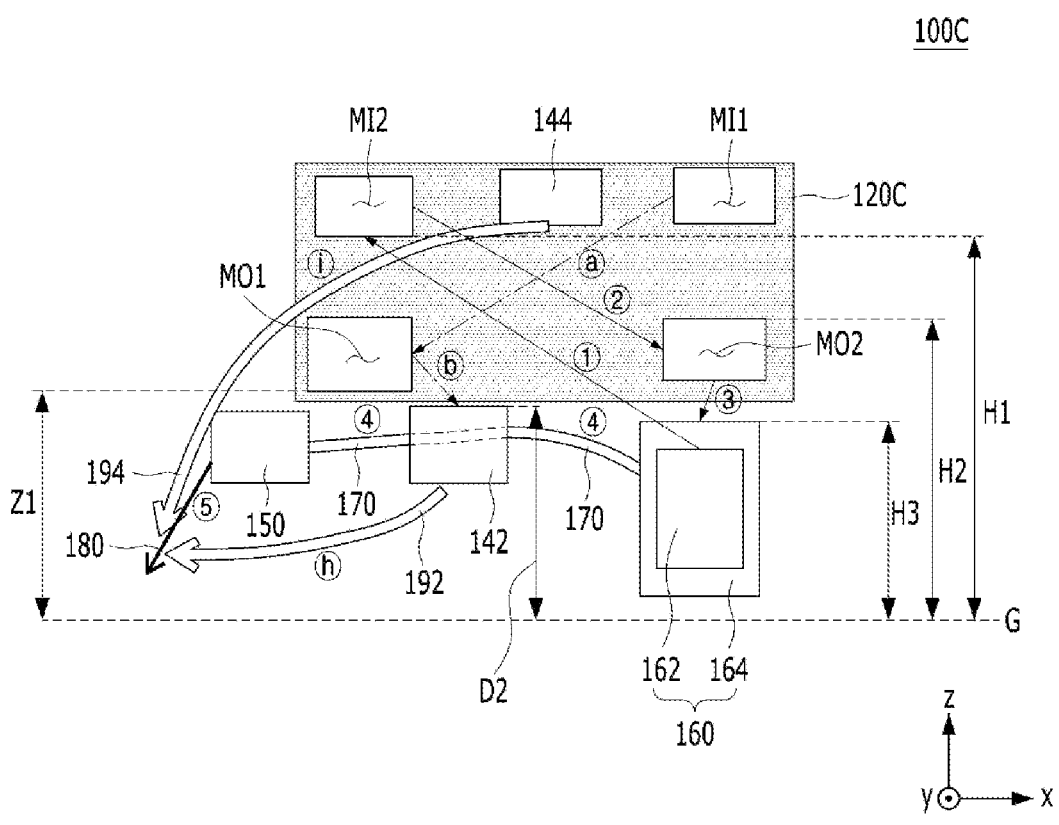
FIG. 4 is a side view of a fuel cell vehicle according to still another embodiment.

FIG. 4 is a side view of a fuel cell vehicle 100C according to still another embodiment.

Similar to the fuel cell vehicle 100B shown in FIG. 3, illustration of the drive motor unit 130 is omitted, but the fuel cell vehicle 100C shown in FIG. 4 may further include a drive motor unit 130, which is disposed below the fuel cell, as shown in FIG. 1.

According to one embodiment, as shown in FIGS. 1, 2, and 3, the purge valve/drain valve assembly 140 may be configured such that a purge valve and a drain valve are integrated.

According to another embodiment, as shown in FIG. 4, a drain valve 142 and a purge valve 144 may be provided separately from each other. In this case, unlike what is illustrated in FIGS. 1 and 3, the cell stack 120C may further include the purge valve 144. With this exception, the cell stack 120C shown in FIG. 4 is the same as the cell stack 120A shown in FIG. 1, and thus a duplicate description thereof will be omitted.

In the case illustrated in FIGS. 1, 2, and 3, since the purge valve/drain valve assembly 140 in which the purge valve and the drain valve are integrated is provided, a single hydrogen exhaust line 190 is provided.

On the other hand, in the case illustrated in FIG. 4, the hydrogen exhaust line may include a first hydrogen exhaust line 192, which is connected to the drain valve 142, and a second hydrogen exhaust line 194, which is connected to the purge valve 144. With this exception, since the fuel cell vehicle 100C shown in FIG. 4 is the same as the fuel cell vehicle 100A shown in FIG. 1, the same parts are denoted by the same reference numerals, and duplicate descriptions thereof will be omitted.

The air pressure controller 150 may serve to adjust the pressure so that the fuel cell vehicles 100A, 100B, and 100C operate at an appropriate operation pressure. For example, the air pressure controller 150 may control the pressure of oxygen, which is the humidified reactant gas.

In the case in which the air discharged from the cell stack 120A, 120B, or 120C of the fuel cell moves to the air exhaust line 180 without resistance, the time during which the air reacts with hydrogen while remaining in the cell stack 120A, 120B, and 120C of the fuel cell may decrease due to the pressure at which an air compressor (not shown) supplies air. In order to prevent this problem, the air pressure controller 150 may adjust the degree of opening of the valve included in the air pressure controller 150 according to a load, thereby forming back pressure to be applied to an air terminal in the cell stack 120A, 120B, and 120C. Accordingly, the air supplied to the cell stack 120A, 120B, and 120C is allowed to react with hydrogen for a sufficient amount of time.

The humidifier 160 may humidify the dry air discharged from the air compressor in a tube 162, and may then supply the humidified air to the cell stack 120A, 120B, or 120C. Also, the humidifier 160 may dehumidify unreacted oxygen containing moisture, discharged from the cell stack 120A, 120B, and 120C, and may then discharge the dehumidified oxygen to the air pressure controller 150. For example, the humidifier 160 may include a dehumidification part including a plurality of cartridges (or a hollow fiber membrane bundle) capable of containing moisture. In this case, the humidifier 160 may introduce unreacted oxygen containing moisture and condensate water discharged from the cell stack 120A, 120B, and 120C of the fuel cell into a shell side 164 between the plurality of hollow fiber membranes, and may then supply moisture to the plurality of hollow fiber membranes. Thereafter, the oxygen dehumidified by supplying moisture to the plurality of hollow fiber membranes may be discharged to the outside through the air exhaust lines 170 and 180.

The air exhaust lines 170 and 180 may serve to discharge unreacted oxygen and the second condensate water that are discharged together from the cell stack 120A, 120B, or 120C of the fuel cell. In order to avoid confusion, the air exhaust line disposed between the humidifier 160 and the input terminal of the air pressure controller 150 will be referred to as the "first air exhaust line 170", and the air exhaust line connected to the output terminal of the air pressure controller 150 will be referred to as the "second air exhaust line 180".

The first air exhaust line 170 may be disposed so as to be spaced apart from the purge valve/drain valve assembly 140, as shown in FIGS. 1 and 3, or may be disposed so as to be spaced apart from the drain valve 142, as shown in FIG. 4. For better understanding, a portion of the first air exhaust line 170 that is not visible due to the purge valve/drain valve assembly 140 or the drain valve 142 is indicated by a dotted line. That is, the first air exhaust line 170 is connected neither to the purge valve/drain valve assembly 140 nor to the drain valve 142.

The second air exhaust line 180 may serve to discharge not only unreacted oxygen and the second condensate water flowing out of the air pressure controller 150 but also unreacted hydrogen and the first condensate water flowing out of the purge valve and the drain valve 140, 142, and 144 to the outside. To this end, the second air exhaust line 180 may include an exhaust duct (not shown) and an exhaust hose (not shown). The exhaust duct forms a flow path along which air and the second condensate water, output from the air pressure controller 150, or hydrogen and the first condensate water, having passed through the hydrogen exhaust line 190 (192 and 194), flow. The exhaust hose serves to discharge the fluid that has passed through the exhaust duct to the outside.

Referring to FIGS. 1 and 3, the hydrogen exhaust line 190 may connect the purge valve/drain valve assembly 140 to the second air exhaust line 180 while avoiding interference with the drive motor unit 130. Referring to FIG. 4, the first hydrogen exhaust line 192 may connect the drain valve 142 to the second air exhaust line 180 while avoiding interference with the drive motor unit 130, and the second hydrogen exhaust line 194 may connect the purge valve 144 to the second air exhaust line 180.

As described above, according to the embodiments, the hydrogen exhaust line 190 and the first hydrogen exhaust line 192 may be disposed so as to avoid interference with the drive motor unit 130. For example, as shown in FIG. 2, the hydrogen exhaust line 190 may be disposed at the rear of the drive motor unit 130 so as to avoid interference with the drive motor unit 130 based on the direction in which the fuel cell vehicle 100A travels.

Hereinafter, the flow of fluid in the fuel cell vehicles 100A, 100B, and 100C according to the embodiments described above will be described with reference to the accompanying drawings. In the following description of the embodiments 100A, 100B, and 100C, the same parts are denoted by the same reference numerals, and duplicate descriptions thereof will be omitted. Therefore, with regard to any aspect of any one of the embodiments 100A, 100B, and 100C that is not described in detail, reference may be made to the description of any other one of the embodiments 100A, 100B, and 100C.

Figure 5:
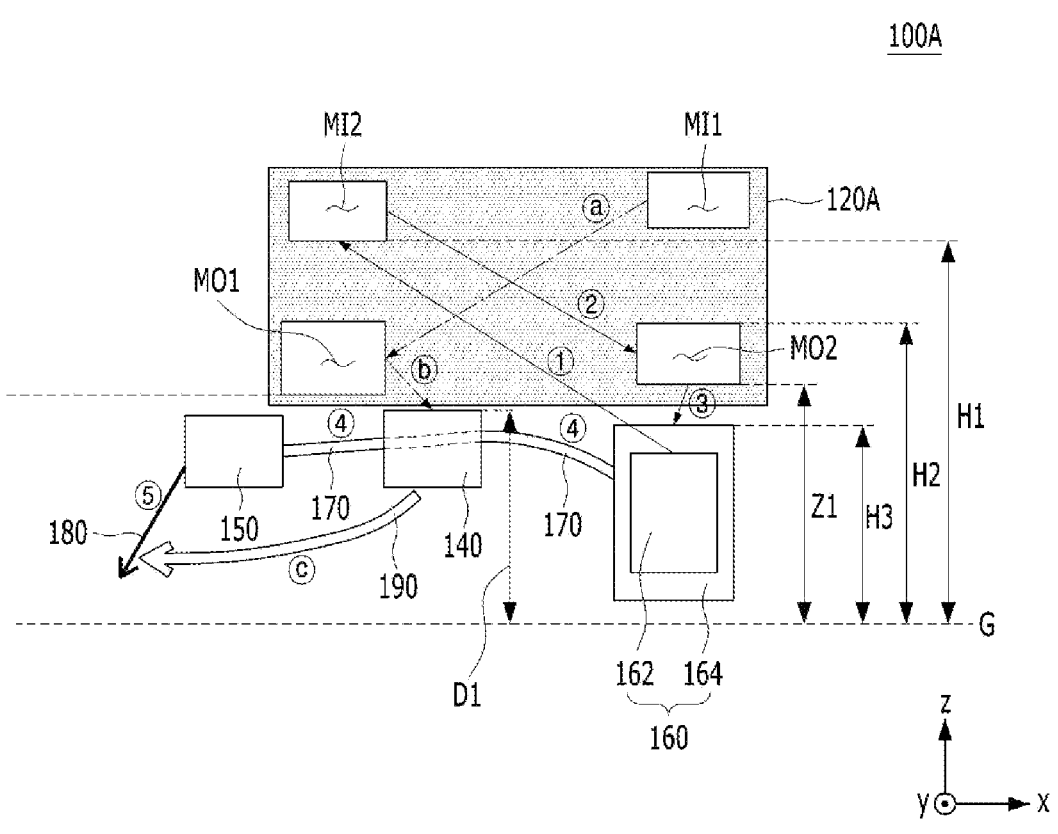
FIG. 5 is a view for explaining the flow of fluid in the fuel cell vehicle according to the embodiment shown in FIG. 1.

FIG. 5 is a view for explaining the flow of fluid in the fuel cell vehicle 100A according to the embodiment shown in FIG. 1. In FIG. 5, illustration of the drive motor unit 130 shown in FIG. 1 is omitted.

First, the flow of air (i.e. the flow of fluid in the cathode) will be described below.

In order to supply clean air to the fuel cell, an air cleaner (not shown) may purify the air received from outside, and provides the purified air to the air compressor. The air compressor may compress the air purified by the air cleaner and provides the compressed air to the tube 162 of the humidifier 160. Thereafter, the humidifier 160 may humidify the dry air discharged from the air compressor and provides the humidified air to the cell stack 120A through the air inflow manifold MI2 (①).

Thereafter, the air supplied to the cell stack 120A may undergo an electrochemical reaction in the cell stack 120A, and then the second condensate water containing residual air, i.e. unreacted oxygen, may be discharged to the air outflow manifold MO2 of the cell stack 120A ((②).

Thereafter, the unreacted oxygen and the second condensate water discharged from the air outflow manifold MO2 may be introduced into the shell side 164 of the humidifier 160, thereby supplying moisture to the plurality of hollow fiber membranes (③). The moisture supplied in this way may move to the tube 162 of the humidifier 160, and may be used to humidify the air supplied along the route ①.

Thereafter, the air, which is the unreacted oxygen, and the second condensate water, other than the moisture moved to the tube 162 of the humidifier 160, may be discharged to the air pressure controller 150 through the first air exhaust line 170 ((④).

Thereafter, the unreacted oxygen and the second condensate water that have passed through the air pressure controller 150 may be discharged to the outside through the second air exhaust line 180 ((⑤).

Next, the flow of hydrogen (i.e. the flow of fluid in the anode) will be described below.

The hydrogen supplied from a hydrogen tank (not shown) may be supplied to the hydrogen inflow manifold MI1 of the cell stack 120A through a hydrogen supply pipe (medium pressure) (not shown) and a hydrogen cutoff/supply valve (not shown).

Thereafter, the hydrogen supplied to the cell stack 120A may undergo an electrochemical reaction in the cell stack 120A, and then unreacted hydrogen and the first condensate water may be discharged to the hydrogen outflow manifold MO1 of the cell stack 120A ((ⓐ).

Thereafter, the unreacted hydrogen and the first condensate water discharged from the hydrogen outflow manifold MO1 may move to the purge valve/drain valve assembly 140 ((ⓑ).

Thereafter, when purging of the unreacted hydrogen is required or when the level of the first condensate water is equal to or higher than a predetermined level, the purge valve/drain valve assembly 140 may discharge the unreacted hydrogen and the first condensate water to the second air exhaust line 180 through the hydrogen exhaust line 190 ((ⓒ). A fuel cell vehicle may employ a hydrogen recirculation structure in order to improve fuel efficiency. During the recirculation process, when the concentration of hydrogen that is supplied to the cell stack 120A falls below a reference concentration value, purging for discharging the hydrogen to the outside may be required.

Alternatively, when purging of the unreacted hydrogen is required and when the level of the first condensate water is not equal to or higher than the predetermined level, the purge valve/drain valve assembly 140 may discharge the unreacted hydrogen and the first condensate water to the second air exhaust line 180 through the hydrogen exhaust line 190. Alternatively, when purging of the unreacted hydrogen is not required and when the level of the first condensate water is equal to or higher than the predetermined level, the purge valve/drain valve assembly 140 may discharge the unreacted hydrogen and the first condensate water to the second air exhaust line 180 through the hydrogen exhaust line 190.

In order to realize the above-described operation, each of the fuel cell vehicles 100A and 100B according to the embodiments shown in FIGS. 5 and 3 may further include a controller (not shown). The controller may generate a control signal when at least one condition, among whether purging of unreacted hydrogen is required and whether the level of the first condensate water is equal to or higher than a predetermined level, is satisfied. The purge valve/drain valve assembly 140 may discharge the unreacted hydrogen and the first condensate water to the second air exhaust line 180 through the hydrogen exhaust line 190 in response to the control signal. That is, the unreacted hydrogen and the first condensate water may be discharged to the outside through the second air exhaust line 180, which is connected to the hydrogen exhaust line 190.

Referring to FIGS. 5 and 3, the bottom surface of each of the air outflow manifold MO2 and the hydrogen outflow manifold MO1 may be located farther from the ground G than the top surface of the purge valve/drain valve assembly 140. That is, when the height of the bottom surface of each of the air outflow manifold MO2 and the hydrogen outflow manifold MO1 from the ground G is "Z1" and the height of the top surface of the purge valve/drain valve assembly 140 from the ground G is "D1", the relationship between "Z1" and "D1" may be expressed using Equation 1 below.

$$Z1 > D1 \qquad \text{[Equation 1]}$$

Accordingly, the destination point of the unreacted hydrogen and the first condensate water may be located closer to the ground G than the departure point thereof. When the relationship shown in Equation 1 above is satisfied, the first condensate water flowing out of the hydrogen outflow manifold MO1 may be smoothly discharged to the purge valve/drain valve assembly 140 by gravity.

Further, in each of the fuel cell vehicles 100A and 100B shown in FIGS. 5 and 3, the outlet of each of the purge valve/drain valve assembly 140 and the hydrogen exhaust line 190 may be located closer to the ground than the inlet thereof. That is, according to the embodiments, the destination point of fluid may be located closer to the ground G than the departure point thereof.

Referring to FIGS. 3, 4, and 5, the bottom surface of each of the air inflow manifold MI2 and the hydrogen inflow manifold MI1 may be located farther from the ground G than the top surface of each of the air outflow manifold MO2 and the hydrogen outflow manifold MO1. Further, the top surface of each of the air outflow manifold MO2 and the hydrogen outflow manifold MO1 may be located farther from the ground G than the top surface of the humidifier 160. That is, when the height of the bottom surface of each of the air inflow manifold MI2 and the hydrogen inflow manifold MI1 from the ground G is "H1", the height of the top surface of each of the air outflow manifold MO2 and the hydrogen outflow manifold MO1 from the ground G is "H2", and the height of the top surface of the humidifier 160 from the ground G is "H3", the relationships among "H1", "H2", and "H3" may be expressed using Equation 2 below.

$$H1 > H2 > H3 \qquad \text{[Equation 2]}$$

When the relationships shown in Equation 2 above are satisfied, the moisture in the cell stack 120A, 120B, or 120C may be discharged by gravity, thus preventing flooding of the fluid.

The routes ⑥, ⑦, ⑧, ⑨, and ⑩ shown in FIG. 3 respectively correspond to the routes ①, ②, ③, ④, and ⑤ shown in FIG. 5, and the routes ⓓ, ⓔ, and ⓕ shown in FIG. 3 respectively correspond to the routes ⓐ, ⓑ, and ⓒ shown in FIG. 5, and thus duplicate descriptions thereof will be omitted.

The positions of the manifolds MI1, MI2, MO1, and MO2 in the fuel cell vehicle 100B shown in FIG. 3 may be different from those in the fuel cell vehicle 100A shown in FIG. 5. Therefore, the route ⓔ between the hydrogen outflow manifold MO1 and the purge valve/drain valve assembly 140 shown in FIG. 3 may be longer than the route ⓑ shown in FIG. 5, and the route ⑧ between the air outflow manifold MO2 and the humidifier 160 shown in FIG. 3 may be longer than the route ③ shown in FIG. 5. However, when the destination point of fluid is located closer to the ground G than the departure point thereof, that is, when the conditions shown in Equations 1 and 2 described above are satisfied, the unreacted hydrogen and the first condensate water may be smoothly discharged to the outside.

Referring to FIGS. 5 and 3, the second air exhaust line 180 may be disposed behind the purge valve/drain valve assembly 140 and the fuel cell based on the direction in which the fuel cell vehicles 100A and 100B travel.

Also, referring to FIG. 4, the second air exhaust line 180 may be disposed behind the drain valve 142 and the fuel cell based on the direction in which the fuel cell vehicle 100C travels.

In the fuel cell vehicle 100C according to the embodiment shown in FIG. 4, the purge valve 144 may be provided separately from the drain valve 142, and may be disposed in the cell stack 144. Therefore, the flow of fluid in the embodiment shown in FIG. 4 may be the same as that in the embodiment shown in FIG. 5, with the exception that the flow of fluid through the second hydrogen exhaust line 194 is added. That is, when the level of the first condensate water is equal to or higher than a predetermined level, the drain valve 142 may discharge the first condensate water to the second air exhaust line 180 through the first hydrogen exhaust line 192 (ⓗ). When purging of the unreacted hydrogen is required, the purge valve 144 may discharge the unreacted hydrogen to the second air exhaust line 180 through the second hydrogen exhaust line 194 (ⓘ).

Further, referring to FIG. 4, the bottom surface of each of the air outflow manifold MO2 and the hydrogen outflow manifold MO1 may be located farther from the ground G than the top surface of the drain valve 142. That is, when the height of the top surface of the drain valve 142 from the ground G is "D2", the relationship between "Z1" and "D2" may be expressed using Equation 3 below.

$$Z1 > D2 \qquad \text{[Equation 3]}$$

When the relationship shown in Equation 3 is satisfied, the first condensate water flowing out of the hydrogen outflow manifold MO1 may be smoothly discharged to the drain valve 142 by gravity.

In the fuel cell vehicle 100C shown in FIG. 4, the outlet of each of the drain valve 142, the first hydrogen exhaust line 192, and the second hydrogen exhaust line 194 may be located closer to the ground G than the inlet thereof.

Figure 6:
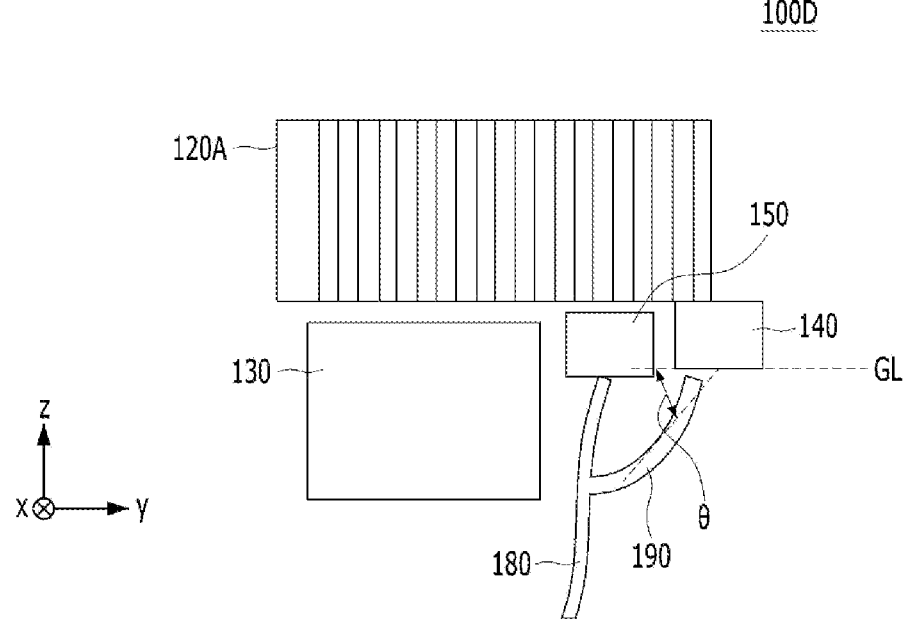
FIG. 6 is a rear view of a fuel cell vehicle according to still another embodiment.

FIG. 6 is a rear view of a fuel cell vehicle 100D according to still another embodiment. In FIGS. 2 and 6, the humidifier 160 is not visible due to the drive motor unit 130.

Unlike the fuel cell vehicle 100A shown in FIG. 2, in the fuel cell vehicle 100D shown in FIG. 6, the air pressure controller 150, which is connected to the second air exhaust line 180, and the purge valve/drain valve assembly 140 may be disposed adjacent to each other in the second direction, without the drive motor unit 130 therebetween. With this exception, since the fuel cell vehicle 100D shown in FIG. 6 is the same as the fuel cell vehicle 100A shown in FIG. 2, the same parts are denoted by the same reference numerals, and duplicate descriptions thereof will be omitted.

When the cell stack 120A is of a transverse type, referring to FIG. 2, the air pressure controller 150, which is connected to the second air exhaust line 180, and the purge valve/drain valve assembly 140 may be disposed so as to be spaced apart from each other, with the drive motor unit 130 interposed therebetween. That is, the air pressure controller 150 and the purge valve/drain valve assembly 140 may be spaced apart from each other by a first distance Y1 in the second direction, and the drive motor unit 130 may have a width Y2 in the second direction. The relationship between "Y1" and "Y2" may be expressed using Equation 4 below.

$$Y1 > Y2 \qquad \text{[Equation 4]}$$

Referring to Equation 4 above, in the case illustrated in FIG. 2, the drive motor unit 130 having a width Y2 may be disposed between the air pressure controller 150 and the purge valve/drain valve assembly 140, and thus the air pressure controller 150 and the purge valve/drain valve assembly 140 may be spaced apart from each other in the second direction by a first distance Y1, which is greater than the width Y2. Accordingly, the length of the hydrogen exhaust line 190 may increase by the distance by which the second air exhaust line 180 and the purge valve/drain valve assembly 140 may be spaced apart from each other. How-ever, as shown in FIG. 6, in the case in which the air pressure controller 150 and the purge valve/drain valve assembly 140 are disposed adjacent to each other, the length of the hydrogen exhaust line 190 may be shorter than in the case illustrated in FIG. 2. When the length of the hydrogen exhaust line 190 is short, the inside of the hydrogen exhaust line 190 may be less likely to freeze due to residual moisture in winter. However, when the drive motor unit 130 is not located at a position that is shifted toward one side, as shown in FIG. 2, the driving performance of the fuel cell vehicle may be improved compared to when the driving motor unit 130 is located at a position that is shifted toward one side, as shown in FIG. 6. Therefore, in consideration thereof, the position of the drive motor unit 130 may be set to any one of the positions shown in FIGS. 2 and 6.

In addition, in order to effectively drain water using gravity, as shown in FIGS. 2 and 6, the angle θ at which the hydrogen exhaust line 190 is inclined with respect to the horizontal plane GL, which is parallel to the ground G, may be set to a designated angle or greater. The designated angle may be, for example, 15°, but the embodiments are not limited thereto.

Figure 7:
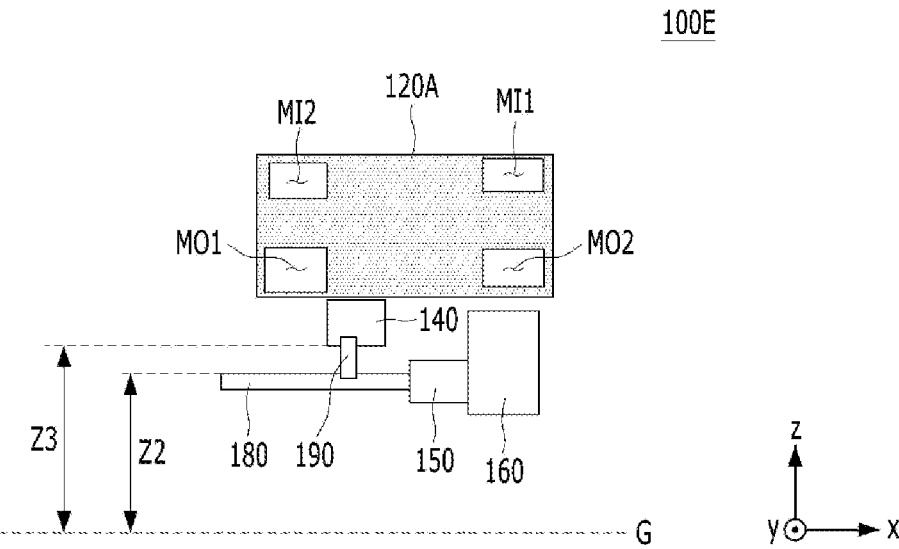
FIG. 7 is a side view of a fuel cell system (or a fuel cell vehicle) according to still another embodiment.

FIG. 7 is a side view of a fuel cell system (or a fuel cell vehicle 100E) according to still another embodiment.

Unlike the fuel cell vehicles 100A to 100D described above, the fuel cell vehicle 100E shown in FIG. 7 may correspond to a commercial vehicle, which is configured such that a fuel cell and a drive motor unit 130 are not mounted together in an engine compartment, or a fuel cell system for power generation. With this exception, since the fuel cell vehicle 100E shown in FIG. 7 is the same as the fuel cell vehicles 100A to 100D described above, the same parts are denoted by the same reference numerals, and duplicate descriptions thereof will be omitted.

In the fuel cell vehicle 100E shown in FIG. 7, since the drive motor unit 130 is not present below the fuel cell, the humidifier 160 and the air pressure controller 150 may be directly connected to each other. For example, the body of the humidifier 160 and the body of the air pressure controller 150 may be directly connected to each other using a bolt or the like, rather than using a hose. Accordingly, dead space between the humidifier 160 and the air pressure controller 150 may be eliminated, thus reducing the overall size of the fuel cell system, and the length of the hydrogen exhaust line 190, which is connected to the second air exhaust line 180 connected to the air pressure controller 150, may be reduced. In this case, in order to effectively discharge the first condensate water, the lower surface of the hydrogen exhaust line 190 may be located closer to the ground G than the lower surface of the purge valve/drain valve assembly 140. That is, when the height of the lower surface of the hydrogen exhaust line 190 from the ground G is "Z2" and the height of the lower surface of the purge valve/drain valve assembly

140 from the ground G is "Z3", the relationship between "Z2" and "Z3" may be expressed using Equation 5 below.

$$Z3>Z2 \qquad \text{[Equation 5]}$$

Figure 8:
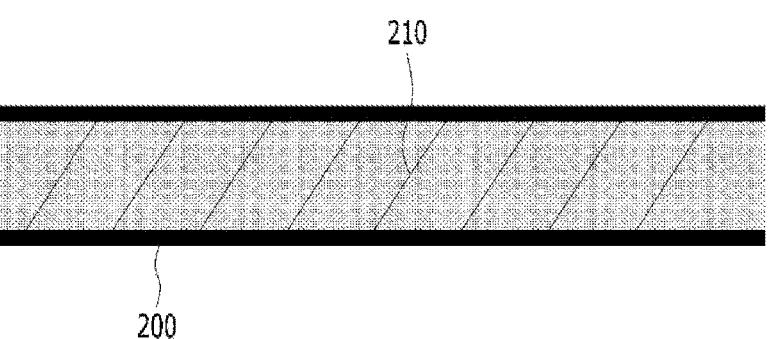
FIG. 8 is a cross-sectional view of a hydrogen exhaust line according to an exemplary embodiment.

FIG. 8 is a cross-sectional view of an exemplary embodi-ment of the hydrogen exhaust lines 190, 192, and 194 described above.

Referring to FIG. 8, the hydrogen exhaust line 190, 192, or 194 may include a thermal insulation material 200 and a heater wire 210. The thermal insulation material 200 may be disposed so as to surround the outside of the hydrogen exhaust line 190, 192, or 194 in order to prevent the inside of the hydrogen exhaust line 190, 192, or 194 from being affected by ambient temperature or to minimize the influ-ence of ambient temperature. The heater wire 210 may be disposed on the outer surface of the hydrogen exhaust line 190, 192, or 194 to emit heat. When the hydrogen exhaust line 190, 192, or 194 is implemented as shown in FIG. 8, the inside thereof may be prevented from freezing.

When the above-described cell stack 120A is of a trans-verse type, the purge valve/drain valve assembly 140 and the drive motor unit 130 may not overlap each other in the direction in which the fuel cell vehicle 100A travels. How-ever, although not shown, when the cell stack is of a longitudinal type, a portion of the purge valve/drain valve assembly 140 and the drive motor unit 130 may overlap each other in the direction in which the fuel cell vehicle travels. When the cell stack 120A is of a transverse type, the position of the drive motor unit 130 may be changed less freely than when the cell stack 120A is of a longitudinal type. Therefore, it is required to avoid interference with the drive motor unit 130 when disposing the hydrogen exhaust line 190. That is, in the case of a transverse type, the hydrogen exhaust line 190 or 192 and the drive motor unit 130 are more likely to interfere with each other than in the case of a longitudinal type. Therefore, when the fuel cell vehicles 100A to 100D according to the embodiments include a transverse-type cell stack, the hydrogen exhaust line 190 may be disposed so as to avoid interference with the drive motor unit 130.

Hereinafter, a fuel cell vehicle according to a comparative example and the fuel cell vehicle according to the embodi-ment will be described with reference to the accompanying drawings.

Figure 9:
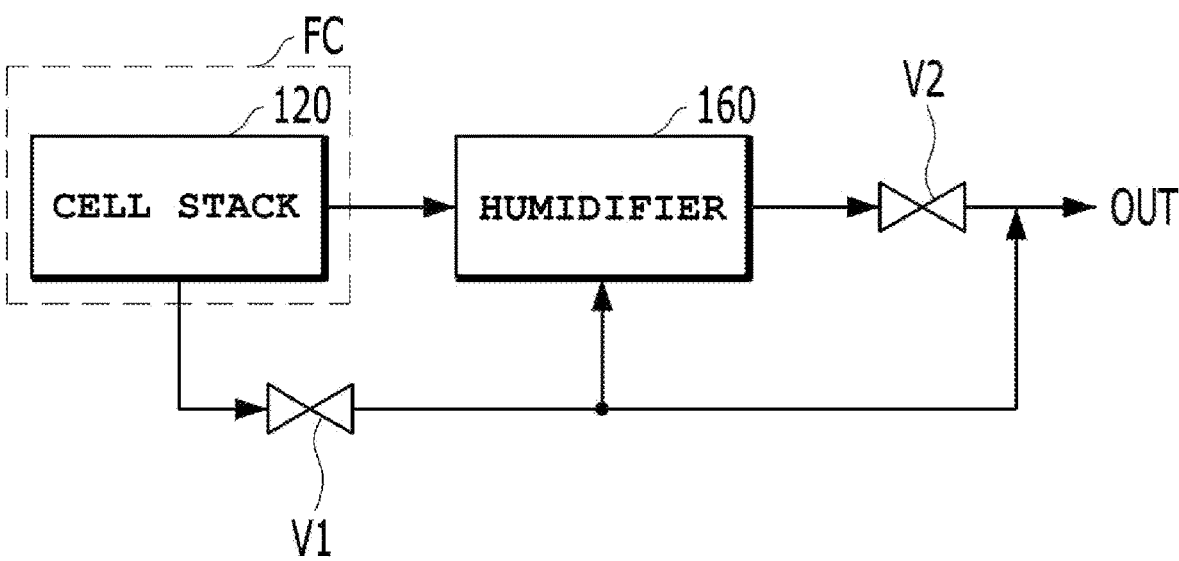
FIG. 9 is a schematic block diagram for explaining purging performed in a fuel cell vehicle.

FIG. 9 is a schematic block diagram for explaining purging performed in a fuel cell vehicle.

FIGS. 10A and 10B are waveform diagrams of stack current I and stack voltage V at each purge position.

The fuel cell vehicle shown in FIG. 9 may include a fuel cell FC including a cell stack 120, a humidifier 160, a purge valve V1, and an air pressure controller V2. Here, the cell stack 120, the humidifier 160, the purge valve V1, and the air pressure controller V2 may respectively perform the same functions as the cell stacks 120A to 120C, the humidi-fier 160, the purge valves 140 and 144, and the air pressure controller 150 described above.

When the purity of hydrogen, which is a reactant gas discharged from the cell stack 120, is reduced, the hydrogen may be discharged to the outside through the purge valve V1.

In one example, the output terminal of the purge valve V1 may be connected to the shell side of the humidifier 160, and the hydrogen flowing out of the humidifier 160 may be discharged to the outside via the air pressure controller V2 and the output terminal OUT. In such a humidifier purge method, there is the possibility that the route along which hydrogen flows and the route along which air flows will mix with each other. Further, because a pressure difference between the anode (high pressure) and the cathode (low pressure) is used during the purging and draining processes, there is the possibility that the pressure of the air supplied from the air supply terminal will be disturbed during the purging operation, and thus the flow rate will be reduced. When the number of revolutions per minute (RPM) of the air compressor is increased in order to compensate for the above problem, the amount of power consumed by the air compressor may increase, the intensity of current I may increase, and the intensity of voltage V may decrease, as indicated by reference numeral 310 in FIG. 10A.

FIG. 11 is a side view of a fuel cell vehicle according to a comparative example.

The fuel cell vehicle according to the comparative example may include a hood 10, a fuel cell including a cell stack 20, a drive motor unit 30, a purge and drain valve 40, an air pressure controller 50, a humidifier 60, air exhaust lines 70 and 80, and a hydrogen exhaust line 90. Here, the hood 10, the cell stack 20, the drive motor unit 30, the purge and drain valve 40, the air pressure controller 50, the humidifier 60, the air exhaust lines 70 and 80, and the hydrogen exhaust line 90 respectively may perform the same functions as the hood 110, the cell stack 120A, the drive motor unit 130, the purge valve/drain valve assembly 140, the air pressure controller 150, the humidifier 160, the air exhaust lines 170 and 180, and the hydrogen exhaust line 190 according to the embodiment shown in FIG. 1, and thus duplicate descriptions thereof will be omitted.

The fuel cell vehicle according to the comparative example shown in FIG. 11 may employ a humidifier purge method in which the purge and drain valve 40 is connected to the humidifier 60 via the hydrogen exhaust line 90. Therefore, the comparative example has the above-mentioned problems caused by the humidifier purge method.

In contrast, referring to FIG. 9, since the output terminal of the purge valve V1 is connected to the output terminal OUT in the rear of the air pressure controller V2, rather than the humidifier 160, fluid may be discharged to the external atmosphere. In such an atmospheric purge method, the intensity of current I does not increase, and the intensity of voltage V does not decrease, as indicated by reference numeral 320 in FIG. 10B, thus improving driving safety. That is, since the air flow path and the hydrogen flow path do not intersect in the humidifier 160, the pressure of hydrogen and the pressure of air may be independently controlled, thereby securing a wider variety of driving strategies and improving the driving stability, such as voltage stability, of a fuel cell vehicle.

The fuel cell vehicles 100A to 100E according to the embodiments may employ an atmospheric purge method in which the hydrogen exhaust lines 190, 192, and 194 are connected to the air exhaust line 180, rather than being connected to the humidifier 160. Accordingly, the pressure at the rear of the air pressure controller 150 may be closer to atmospheric pressure than the pressure at the side of the humidifier 160 (i.e. the air supply side), and thus the pressure difference from the anode may increase. As a result, this is advantageous from the aspect of discharge of water, compared to a humidifier purge method.

As is apparent from the above description, a fuel cell vehicle according to embodiments may secure a wider variety of driving strategies, may improve driving stability, such as voltage stability, and may be advantageous from the aspect of discharge of water, compared to a humidifier purge method.

However, the effects achievable through the present disclosure are not limited to the above-mentioned effects, and other effects not mentioned herein will be clearly understood by those skilled in the art from the above description.

The above-described various embodiments may be combined with each other without departing from the scope of the present disclosure unless they are incompatible with each other.

In addition, for any element or process that is not described in detail in any of the various embodiments, reference may be made to the description of an element or a process having the same reference numeral in another embodiment, unless otherwise specified.

While the present disclosure has been particularly shown and described with reference to exemplary embodiments thereof, these embodiments are only proposed for illustrative purposes, and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

What is claimed is:

1. A fuel cell vehicle, comprising:
   a fuel cell comprising a cell stack configured such that a plurality of unit cells is stacked;
   a drive motor unit disposed below the fuel cell;
   a purge valve/drain valve assembly configured to discharge unreacted hydrogen and first condensate water flowing together out of the fuel cell;
   an air exhaust line configured to discharge unreacted oxygen and second condensate water flowing together out of the fuel cell; and
   a hydrogen exhaust line connecting the purge valve/drain valve assembly to the air exhaust line;
   wherein the fuel cell further comprises:
      an air outflow manifold being configured to discharge the unreacted oxygen and the second condensate water; and
      a hydrogen outflow manifold being configured to discharge the unreacted hydrogen and the second condensate water; and
      wherein a bottom surface of each of the air outflow manifold and the hydrogen outflow manifold is located farther from a ground than a top surface of the purge valve/drain valve assembly.

2. The fuel cell vehicle according to claim 1, wherein the hydrogen exhaust line is disposed so as to avoid interference with the drive motor unit.

3. The fuel cell vehicle according to claim 1, wherein the hydrogen exhaust line is disposed behind the drive motor unit based on a direction in which the fuel cell vehicle travels.

4. The fuel cell vehicle according to claim 1, wherein the purge valve/drain valve assembly is configured such that a purge valve and a drain valve are integrated.

5. The fuel cell vehicle according to claim 1, wherein the purge valve/drain valve assembly is configured such that a purge valve and a drain valve are provided separately from each other.

6. The fuel cell vehicle according to claim 5, wherein the hydrogen exhaust line comprises:
   a first hydrogen exhaust line connecting the drain valve to the air exhaust line, the first hydrogen exhaust line being disposed so as to avoid interference with the drive motor unit; and a second hydrogen exhaust line connecting the purge valve to the air exhaust line.

7. The fuel cell vehicle according to claim 5, wherein the purge valve is disposed in the fuel cell, and wherein the drain valve is disposed closer to the ground than the fuel cell.

8. The fuel cell vehicle according to claim 1, further comprising:

a controller configured to generate a control signal when at least one condition, among whether purging of the unreacted hydrogen is required and whether a level of the first condensate water is equal to or higher than a predetermined level, is satisfied, wherein the purge valve/drain valve assembly discharges the unreacted hydrogen and the first condensate water to the hydrogen exhaust line in response to the control signal.

9. The fuel cell vehicle according to claim 1, wherein an outlet of each of the purge valve/drain valve assembly and the hydrogen exhaust line is located closer to ethe ground than an inlet thereof.

10. The fuel cell vehicle according to claim 1, wherein the plurality of unit cells is stacked in a direction intersecting a direction in which the fuel cell vehicle travels.

11. The fuel cell vehicle according to claim 10, further comprising:

an air pressure controller connected to the air exhaust line, wherein the air pressure controller and the purge valve/drain valve assembly are spaced apart from each other, with the drive motor unit interposed therebetween.

12. The fuel cell vehicle according to claim 1, wherein the plurality of unit cells is stacked in a direction parallel to a direction in which the fuel cell vehicle travels.

13. The fuel cell vehicle according to claim 12, wherein a portion of the purge valve/drain valve assembly overlaps the drive motor unit in the direction in which the fuel cell vehicle travels.

14. The fuel cell vehicle according to claim 1, wherein the hydrogen exhaust line is inclined at an angle of 15° or greater with respect to a horizontal plane parallel to the ground.

15. The fuel cell vehicle according to claim 1, further comprising:

an air pressure controller connected to the air exhaust line, wherein the air pressure controller and the purge valve/drain valve assembly are disposed adjacent to each other, without the drive motor unit therebetween, in a direction intersecting a direction in which the fuel cell vehicle travels.

16. The fuel cell vehicle according to claim 1, wherein the air exhaust line is disposed behind the purge valve/drain valve assembly and the fuel cell based on a direction in which the fuel cell vehicle travels.

17. The fuel cell vehicle according to claim 16, wherein the fuel cell further comprises:

a hydrogen inflow manifold configured to receive hydrogen flowing thereinto as a reactant gas; and an air inflow manifold disposed behind the hydrogen inflow manifold based on the direction in which the fuel cell vehicle travels, the air inflow manifold being configured to receive air flowing thereinto as a reactant gas;

wherein the air outflow manifold is disposed below the hydrogen inflow manifold; and wherein the hydrogen outflow manifold is disposed below the air inflow manifold and behind the air outflow manifold based on the direction in which the fuel cell vehicle travels.

18. The fuel cell vehicle according to claim 16, wherein the fuel cell further comprises:

an air inflow manifold configured to receive air flowing thereinto as a reactant gas; and a hydrogen inflow manifold disposed behind the air inflow manifold based on the direction in which the fuel cell vehicle travels, the hydrogen inflow manifold being configured to receive hydrogen flowing thereinto as a reactant gas;

wherein the hydrogen outflow manifold is disposed below the air inflow manifold; and wherein the air outflow manifold is disposed below the hydrogen inflow manifold and behind the hydrogen outflow manifold based on the direction in which the fuel cell vehicle travels.

19. The fuel cell vehicle according to claim 17, wherein a bottom surface of each of the air inflow manifold and the hydrogen inflow manifold is located farther from the ground than a top surface of each of the air outflow manifold and the hydrogen outflow manifold, and wherein the top surface of each of the air outflow manifold and the hydrogen outflow manifold is located farther from the ground than a top surface of a humidifier.

* * * * *